(12) United States Patent
Schmidt et al.

(10) Patent No.: US 11,478,918 B2
(45) Date of Patent: Oct. 25, 2022

(54) SELF-ALIGNING TOOL GUIDE

(71) Applicant: Hilti Aktiengesellschaft, Schaan (LI)

(72) Inventors: Peer Schmidt, Lindau (DE); Dario Bralla, Buchs (CH); Serhey Khandozhko, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 340 days.

(21) Appl. No.: 16/766,594

(22) PCT Filed: Oct. 31, 2018

(86) PCT No.: PCT/EP2018/079806
§ 371 (c)(1),
(2) Date: May 22, 2020

(87) PCT Pub. No.: WO2019/101484
PCT Pub. Date: May 31, 2019

(65) Prior Publication Data
US 2021/0162579 A1 Jun. 3, 2021

(30) Foreign Application Priority Data

Nov. 23, 2017 (EP) .................................... 17203223

(51) Int. Cl.
*G06F 17/00* (2019.01)
*B25H 1/00* (2006.01)
(Continued)

(52) U.S. Cl.
CPC ......... *B25H 1/0028* (2013.01); *B25H 1/0035* (2013.01); *B25J 5/007* (2013.01);
(Continued)

(58) Field of Classification Search
CPC ...... B25H 1/0028; B25H 1/0035; B25J 5/007; B25J 11/005; B60T 7/22; B25D 17/32;
(Continued)

(56) References Cited

U.S. PATENT DOCUMENTS 2,872,200 A * 2/1959 Kroll ................ B60G 17/01925
280/124.112
4,757,971 A * 7/1988 Mapes ................... B63H 20/06
248/642

(Continued)

FOREIGN PATENT DOCUMENTS

CA 2 841 506 A1 8/2015
DE 33 28 582 A1 3/1984
(Continued)

OTHER PUBLICATIONS

PCT/EP2018/079806, International Search Report dated Jan. 2, 2019 (Three (3) pages).
(Continued)

*Primary Examiner* — Ronnie M Mancho
(74) *Attorney, Agent, or Firm* — Crowell & Moring LLP

(57) ABSTRACT

A self-aligning tool guide has a holder for securing a portable power tool for working on a ceiling, a lifting mechanism, and a self-balancing chassis. The holder is mounted on the lifting mechanism. The lifting mechanism has a propulsion system for raising the holder parallel to a lifting axis. The self-balancing chassis has two wheels on a wheel axis, a drive coupled to the two wheels, and a steering system. A contact sensor serves for detecting an indirect contact of the holder with the ceiling. The chassis has a brake. A controller has a mode in which the brake is activated and the balancing of the self-balancing chassis is deactivated.

5 Claims, 5 Drawing Sheets

(51) Int. Cl.
  *B25J 5/00* (2006.01)
  *B25J 11/00* (2006.01)
  *B60T 7/22* (2006.01)
  *B60L 50/60* (2019.01)
  *B25D 17/32* (2006.01)
  *B60L 15/20* (2006.01)

(52) U.S. Cl.
  CPC ............... *B25J 11/005* (2013.01); *B60T 7/22* (2013.01); *B25D 17/32* (2013.01); *B60L 15/20* (2013.01); *B60L 50/60* (2019.02); *B60L 2200/16* (2013.01); *B60L 2200/40* (2013.01); *B60L 2260/34* (2013.01)

(58) Field of Classification Search
  CPC ...... B60L 15/20; B60L 50/60; B60L 2200/16; B60L 2200/40; B60L 2260/34; B60L 50/50; Y02T 10/70; Y02T 10/72
  USPC .......................................................... 248/550
  See application file for complete search history.

(56) References Cited

U.S. PATENT DOCUMENTS

| | | | | |
|---|---|---|---|---|
| 4,790,548 | A * | 12/1988 | Decelles | A61G 5/061 180/8.2 |
| 5,794,721 | A * | 8/1998 | Clonch | E21D 20/003 175/45 |
| 9,278,736 | B2 * | 3/2016 | Van Der Tempel | B63B 27/30 |
| 9,506,345 | B2 * | 11/2016 | Vogel | E02D 5/801 |
| 9,747,480 | B2 * | 8/2017 | McAllister | H01Q 11/08 |
| 9,789,412 | B2 * | 10/2017 | Mainville | A63H 3/02 |
| 10,283,008 | B2 * | 5/2019 | Vatcher | G09B 9/12 |
| 10,634,718 | B2 * | 4/2020 | Baer | B25J 15/00 |
| 2004/0007425 | A1 * | 1/2004 | Kamen | B60L 15/20 182/141 |
| 2005/0265486 | A1 | 12/2005 | Crawley | |
| 2008/0147281 | A1 * | 6/2008 | Ishii | B62D 51/02 180/218 |
| 2009/0055033 | A1 * | 2/2009 | Gansler | B60L 3/00 701/1 |
| 2009/0271058 | A1 * | 10/2009 | Chilson | B60L 15/2036 701/23 |
| 2010/0174476 | A1 | 7/2010 | Fuwa | |
| 2014/0069733 | A1 * | 3/2014 | Kahlert | B62H 1/12 180/218 |
| 2015/0060162 | A1 * | 3/2015 | Goffer | B60L 15/20 180/41 |
| 2017/0094144 | A1 * | 3/2017 | Tomomasa | B60L 15/20 |
| 2020/0109937 | A1 * | 4/2020 | Zweigle | B25J 19/022 |
| 2020/0346340 | A1 * | 11/2020 | Schmidt | B25H 1/0035 |
| 2021/0001472 | A1 * | 1/2021 | Schmidt | B25H 1/0028 |
| 2021/0162579 | A1 * | 6/2021 | Schmidt | B25H 1/0028 |
| 2022/0184790 | A1 * | 6/2022 | Schmidt | B28D 1/14 |
| 2022/0184797 | A1 * | 6/2022 | Bangalore Srinivas | B25J 9/1689 |

FOREIGN PATENT DOCUMENTS

| | | | |
|---|---|---|---|
| DE | 297 09 281 U1 | 1/1998 | |
| DE | 10 2007 000 253 A1 | 11/2008 | |
| DE | 102012009863 A1 * | 11/2013 | ........... B25J 13/006 |
| FR | 2 446 155 A1 | 8/1980 | |
| JP | 6-307076 A | 11/1994 | |
| WO | WO-2021094218 A1 * | 5/2021 | ........... B25H 1/0028 |

OTHER PUBLICATIONS

Segway Inc., "User Manual—Segway Personal Transporter", 2014, XP002780951 (Five (5) pages).

U.S. Patent Application, "Self-Aligning Tool Guide", filed May 22, 2020, Inventor: Peer Schmidt et al.

* cited by examiner

SELF-ALIGNING TOOL GUIDE

CROSS REFERENCE TO RELATED APPLICATIONS

This application claims the priority of International Application No. PCT/EP2018/079806, filed Oct. 31, 2018, and European Patent Document No. 17203223.7, filed Nov. 23, 2017, the disclosures of which are expressly incorporated by reference herein

BACKGROUND AND SUMMARY OF THE INVENTION

The invention relates to a self-aligning tool guide and to a control method for the tool guide.

Suspended ceilings are a design element frequently encountered in large buildings, in particular in industrial and office buildings. Technical installations, for example electrical installations, ventilation systems, lighting and soundproofing can be laid between the ceiling of the shell and the suspended ceiling and are accessible for subsequent inspection and maintenance. Supporting substructures of the installations and of the suspended ceiling are fastened with dowels, screws or similar elements anchored in the ceiling of the shell. In order to construct the suspended ceiling, holes into which the dowels or the screws can be screwed are drilled into the ceiling of the shell. A lateral position of the holes is predetermined by the supporting substructure.

The drilling of the holes is time-consuming. The user can reach the high hanging ceiling of the shell only with a ladder or a scaffold. The ladder has to be placed below the specified position, the user climbs up the ladder, drills the hole, climbs down the ladder and moves the ladder to the next position.

DE 33 28 582 A1 describes a mobile ceiling drilling and assembly appliance for mounting impact dowels in a room ceiling. The ceiling drilling appliance is based on an impact drill which is mounted on a telescopic pillar. The telescopic pillar is suspended in an oscillating manner on a trolley. The user can move the ceiling drilling appliance below a desired location, can set the impact drill with respect to the room ceiling by means of the pillar and can drill a hole into the ceiling. The impact drill can be controlled via a switch panel. For transport via staircases, the appliance has to be dismantled into four parts—trolley, telescopic pillar, impact drill and switch panel.

A refinement of the invention relates to a self-aligning tool guide. The tool guide has a holder, a lifting mechanism and a chassis. The holder is for securing a portable power tool. The holder is mounted on the lifting mechanism. The lifting mechanism has a propulsion system for vertically raising the holder. The chassis has two wheels on a wheel axis, a drive coupled to the wheels and a steering system. The lifting mechanism is mounted rigidly on the chassis. A center of gravity sensor is configured for detecting a lateral deflection of the center of gravity of the lifting mechanism in relation to the wheel axis. The steering system is configured in order to activate the drive to output a torque counteracting the deflection.

The self-aligning tool guide permits a very compact and lightweight construction by being able to reduce the number of assemblies. The dynamic stabilization permits a stable standing position of the tool guide just on one wheel or on two wheels.

The axis of the tool is aligned in a defined manner by means of the drive controller and the wheels. During a deflection of the tool from the specified direction, the wheels actively exert a counter torque which correctly aligns the tool again. This is necessary in particular when placing the tool on the ceiling. Both floor and ceiling of a shell are undulating and are inclined in relation to the horizontal, and therefore transverse forces act on the tool. A freely oscillating tool would avoid the transverse forces by being deflected and would therefore lead to an erroneous alignment of the tool.

A refinement of the invention includes a holder for securing a portable power tool, a lifting mechanism and a self-balancing chassis. A holder is mounted on the lifting mechanism and can be raised and can be lowered parallel to a lifting axis with a propulsion system of the lifting mechanism. The self-balancing chassis has two wheels on a wheel axis and a drive coupled to the wheels. The lifting mechanism is mounted rigidly on the chassis. An inclination sensor detects an inclination of a wheel axis of the chassis in relation to a horizontal plane. A steering system has a mode S9 in which the steering system rotates the chassis about a vertical axis by means of the drive until the inclination is equal to zero. In addition, the tool guide has a center of gravity sensor for detecting a lateral deflection x of the center of gravity G in relation to the wheel axis. The steering system is configured to output a torque counteracting the deflection.

For the tool guide standing only on two wheels, there is always a position in which the wheel axis can be aligned parallel to the horizontal, solely by rotation about the vertical axis. In a system with three or more wheels, the lifting mechanism has to be mounted pivotably in relation to the wheel axes.

A refinement of the self-aligning tool guide according to the invention has a holder for securing a portable power tool for working on a ceiling, a lifting mechanism and a self-balancing chassis. The holder is mounted on the lifting mechanism. The lifting mechanism has a propulsion system for raising the holder parallel to a lifting axis. The self-balancing chassis has two wheels on a wheel axis, a drive coupled to the wheels and a steering system. A sensor serves for detecting a contact pressure of the holder, said contact pressure acting in the direction of gravitational force. The control station activates the propulsion system depending on the detected contact pressure.

A refinement of the self-aligning tool guide according to the invention has a holder for securing a portable power tool for working on a ceiling, a lifting mechanism and a self-balancing chassis. The holder is mounted on the lifting mechanism. The lifting mechanism has a propulsion system for raising the holder parallel to a lifting axis. The self-balancing chassis has two wheels on a wheel axis, a drive coupled to the wheels and a steering system. A contact sensor serves for detecting an indirect contact of the holder with the ceiling. The chassis has a brake. The controller has a mode S9 in which the brake is activated and the balancing of the self-balancing chassis is deactivated.

The tool guide generally touches the floor only with the two wheels. An upright standing position is ensured only by balancing the chassis. During work on the ceiling, a third contact point arises which may be sufficient for an upright standing position without balancing. The static standing position without balancing may be advantageous during the work. The brake supports the stability.

A refinement of the self-aligning tool guide according to the invention has a holder for securing a portable power tool, a lifting mechanism and a self-balancing chassis. The holder is mounted on the lifting mechanism. A propulsion system serves for raising the holder parallel to a lifting axis. A control station serves for operating the propulsion system by a user. The self-balancing chassis has two wheels on a wheel axis, a drive coupled to the wheels and a steering system for operation of the chassis by an operator. An arrangement of electric batteries is for supplying the propulsion system and the drive with power. An emergency power device has a charging state sensor for determining a charging state of the arrangement of electric batteries. A deactivation unit deactivates the control station in response to the charging state falling below an emergency charge.

The tool guide has its own power supply. The power supply is available for operating the lifting mechanism, optionally the portable power tool, but also for the chassis. At a low charging state, it is emphasized to the user, by deactivation of the control station, and therefore of the lifting mechanism and the portable power tool, that the batteries need to be charged or changed. This prevents the tool guide from falling over due to empty batteries and as a result of a loss of balance.

DETAILED DESCRIPTION OF THE DRAWINGS

Figure 1:
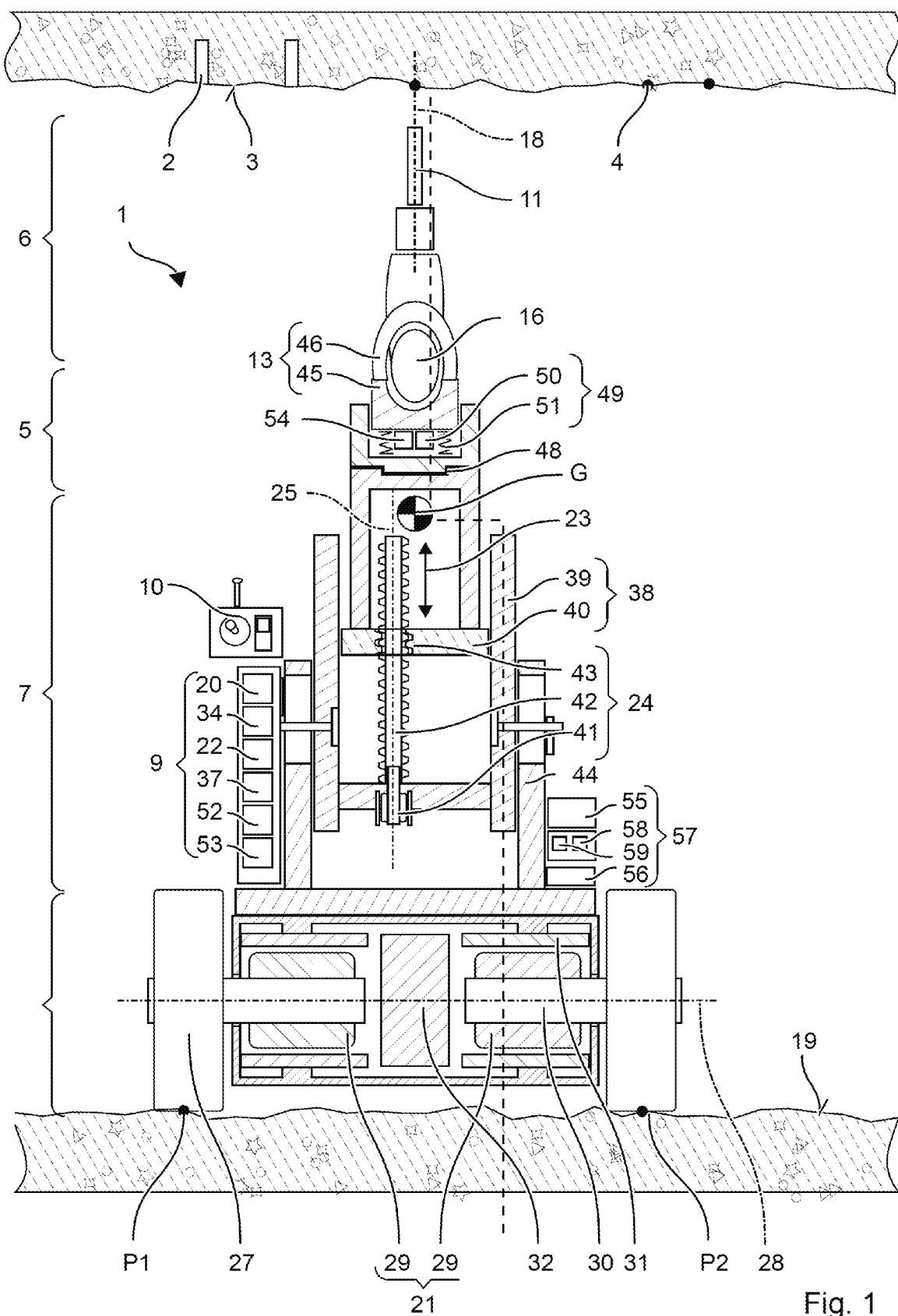
FIG. 1 shows the self-aligning tool guide from the front.

Identical or functionally identical elements are indicated by the same reference numerals in the Figures, unless stated otherwise. In the context of this description, vertically denotes a direction parallel to the gravitational force; horizontally denotes a direction or plane perpendicular to the gravitational force.

Figure 2:
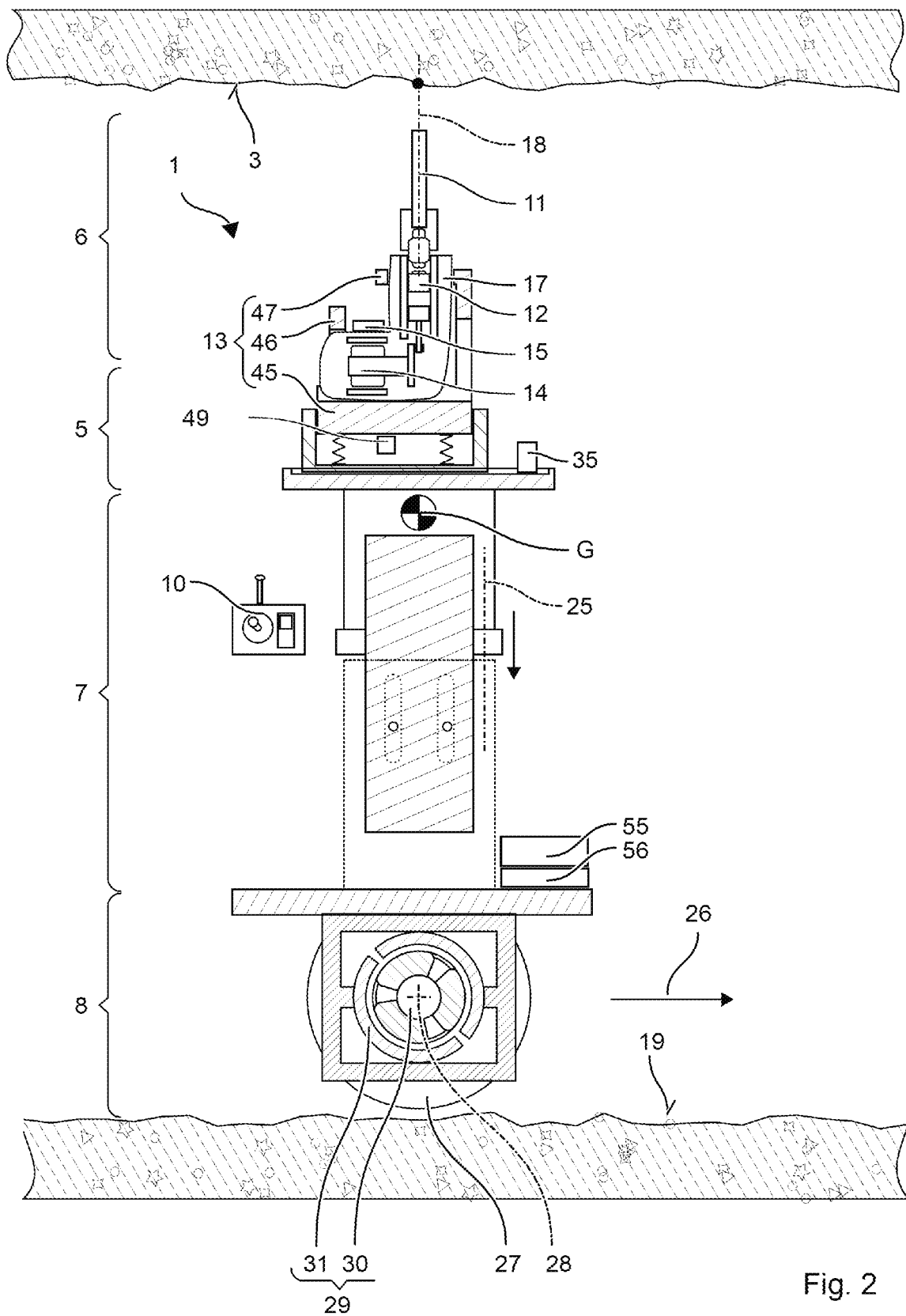
FIG. 2 shows the self-aligning tool guide in the section I-I.
Figure 3:
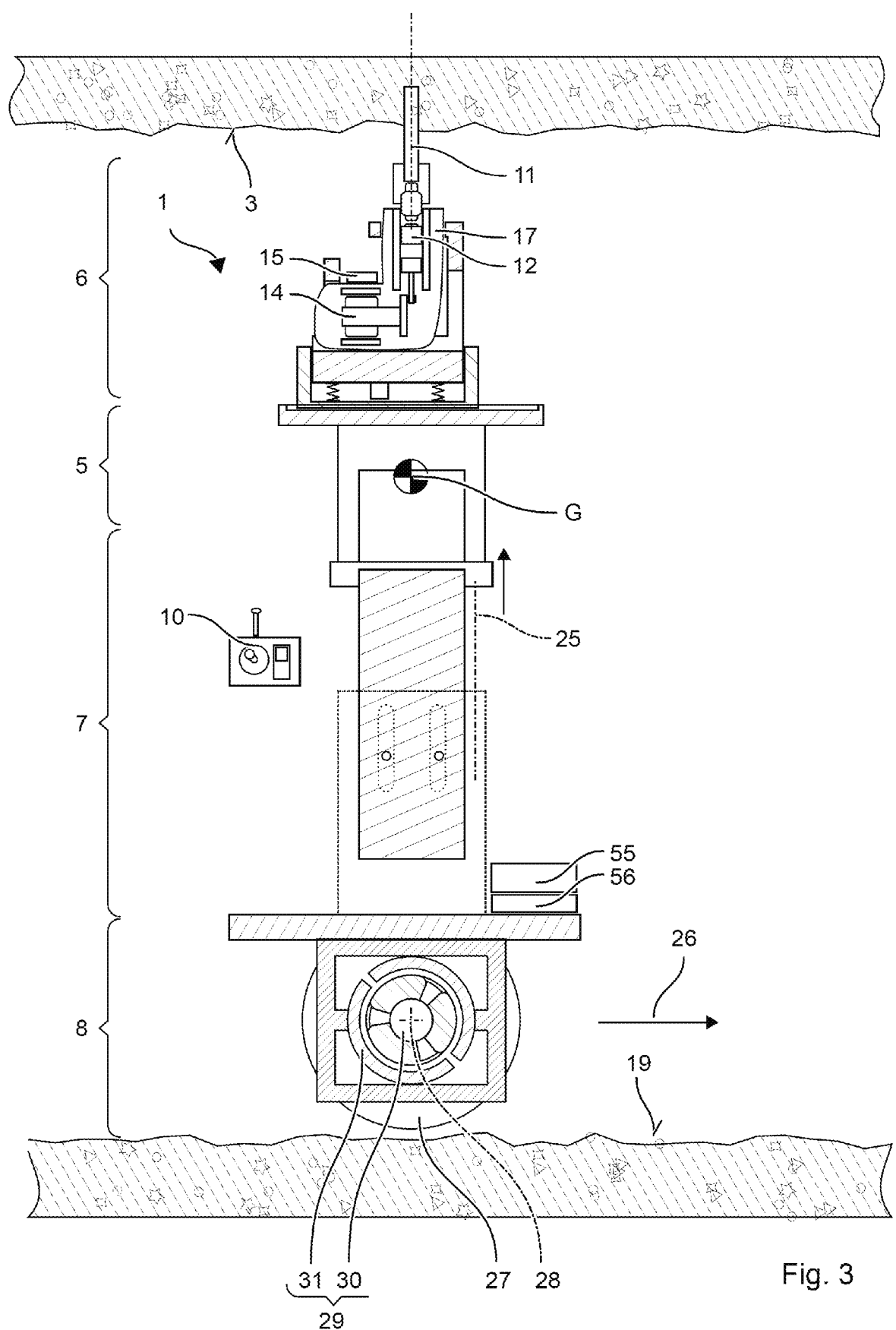
FIG. 3 shows the self-aligning tool guide during working on a ceiling in the section I-I.

FIG. 1 and FIG. 2 show an exemplary self-aligning tool guide 1 for installation work in a shell. For example, installation of a ventilation pipe requires a plurality of holes 2 in a ceiling 3 of the shell. The holes 2 are intended to be located at specified positions 4, for example in an alignment. Furthermore, the holes 2 are intended to be parallel to one another, for example oriented vertically. The position 4 is shown, for example, in a plan. A foreman can indicate the position 4 by color markings on the ceiling 3 of the shell. Other installation work on the ceiling 3 may comprise the punching of nails, driving in of screws, sanding, etc.

FIG. 1 and FIG. 2 schematically show an embodiment of the self-aligning tool guide 1. The tool guide 1 has a holder 5 for a portable power tool 6, a motorized lifting mechanism 7, a motorized chassis 8, a controller 9 and a console 10.

The user can equip the tool guide 1 with a suitable portable power tool 6 and a suitable tool 11 according to the application. For drilling holes 2 into a shell, these would be, for example, a hammer drill with an impact mechanism 12 and a drill with a sintered carbide metal tip. The portable power tool 6 can be inserted into the holder 5 on the lifting mechanism 7. A lock 13 secures the portable power tool 6 in the holder 5. The lock 13 can preferably be released without a tool. In other embodiments, the portable power tool can be permanently connected, for example screwed, to the holder 5.

The hammer drill is just one example of a portable power tool 6. Other examples include an electric screwdriver, a nail punch, an angle grinder, a glue gun, a paint gun, etc. One type of portable power tools 6 drives an exchangeable tool 11, for example the drill, a chisel, a screwdriver bit, a cut-off wheel, etc. for the operation thereof. Another type of portable power tools 6 directly processes a consumable material, for example nails, screws, paint and adhesive. The portable power tools 6 are distinguished by their own drive with which the tool 11 is driven or the consumable material is driven in or applied. The user does not have to apply any manual force for using the portable power tool 6. The portable power tools are referred to as power tools. The power source 14 can be driven electrically or by fuel. Examples include an electric motor, an electric pump, a gas-fed internal combustion engine, a power-driven piston, etc. The power source 14 is coupled to a (triggering) button 15. When the triggering button 15 is pressed, the power source 14 is activated. The triggering button 15 is preferably remotely triggerable or lockable.

The portable power tool 6 can be a commercially available portable power tool 6. The portable power tool 6 has a handle 16 and typically a housing section 17 for the fastening of an additional handle. The portable power tool 6 can be designed without a handle. The holder 5 can also be configured for portable power tools which are not hand-held.

The portable power tool 6 have a working axis 18 defined by their design. A tip of the tool 11 or a tip of the consumable material lies on the working axis 18. The tip is moved along the working axis 18. The tip first touches the underlying surface to be worked on, for example the ceiling 3.

Figure 4:
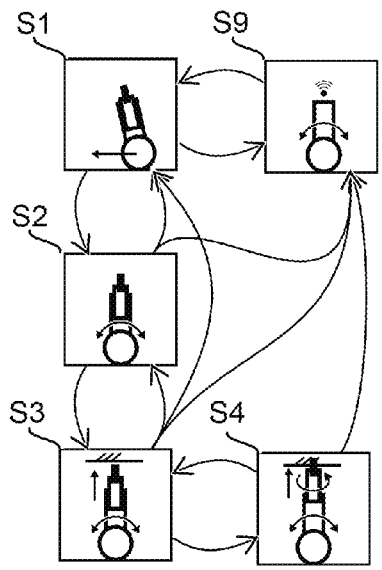
FIG. 4 shows a status diagram.

A status diagram of the tool guide 1 shown in FIG. 4. The user activates the tool guide 1 by means of the console 10. The chassis 8 is in a (mobile) mode S1 in which the user can move the tool guide 1 on the floor 19 through the room. The controller 9 activates a steering system 20 of the tool guide 1. The user can specify direction of travel and speed via the console 10. The user steers the tool guide 1 to one of the marked positions 4. The chassis 8 has a drive 21 which moves the chassis 8 by its own power over the floor 19. Direction and speed of movement of the chassis 8 are controlled by the steering system 20 of the tool guide 1. For this purpose, the steering system 20 processes, inter alia, the specifications regarding speed and direction of travel that are input by the console 10.

The user stops the tool guide 1 at the marked position 4. The user sets the chassis 8 into a (standing) mode S2 via the console 10. The controller 9 blocks the steering system 20 for the user or switches the steering system 22 to inactive. The steering system 20 ignores the specifications regarding speed and direction of travel that are input by the console 10. The tool guide 1 remains in the position 4 currently adopted. The steering system 20 can detect the current position 4. If the chassis 8 leaves the current position 4 or is moved out of the latter, the steering system 20 automatically generates control signals in order to move the chassis 8 back into the detected position 4.

The user can activate a (lifting) mode S3 via the console 10 in order to raise the portable power tool 6 with the lifting mechanism 7, The controller 9 forces the standing mode S2 for the chassis 8 before the lifting mode can be activated. The controller 9 can delay the activation of the lifting mode until the chassis 8 is stationary, A control station 22 for the user is enabled or activated in the lifting mode. The user can specify the direction of movement 23, i.e., up or down, and lifting speed and position of the lifting mechanism 7 via the console 10. The holder 5 is correspondingly moved by the lifting mechanism 7. The control station 22 activates a propulsion system 24 of the lifting mechanism 7 taking into consideration the vertical direction of movement and lifting speed specified via the console 10. The lifting mechanism 7 lifts or lowers the holder 5 and optionally the portable power tool 6, which is inserted into the latter, along a fixed lifting axis 25. The lifting mechanism 7 is limited to a uniaxial, translatory movement on the lifting axis 25.

The working axis 18 of the portable power tools 6 is parallel to the lifting axis 25. In one refinement, the design of the holder 5 forces the parallel alignment. The portable power tool 6 can be inserted in the holder 5 in only one defined way, for example, because of a shape of the holder 5 matching a housing of the portable power tool 6. In one refinement, the holder 5 is pivotable about a (pivot) axis inclined with respect to the lifting axis 25, in order to align the working axis 18 on the lifting axis 25.

The lifting axis 25 and therefore the working axis 18 are aligned dynamically in relation to the ceiling 3 by the chassis 8. The chassis 8 aligns the lifting axis 25 vertically, i.e., parallel to the gravitational force.

The portable power tool 6 can preferably be switched on via the control station 22. The tool 11 can work on the ceiling 3, for example can drill a hole 2. The controller 9 can have a (working) mode S4 which automatically controls the propulsion system 24 of the lifting mechanism 7 during the working on the ceiling 3. The working mode can be activated manually, for example, at the console 10. In the working mode, the control station 22 adapts the lifting speed of the lifting mechanism 7 to the working progress of the tool 11. The lifting mechanism 7 and the tool 11 can be protected against excessive loadings. A working goal, for example a drill hole depth, can be specified to the control station 22. After the working goal has been reached, the control station 22 can automatically stop the propulsion system 24. In addition, the control station 22 can automatically lower the lifting mechanism 7 to an extent such that the tool 11 is disengaged from the ceiling 3.

The user can now deflect the tool guide 1 to a next marked position 4. The user switches the tool guide 1 over into the mobile mode S1. The control station 22 is blocked for the user. The portable power tool 6 is forcibly switched off. The tool guide 1 can check before stopping whether the tool 11 is still in engagement with the ceiling 3. For example, the steering system 20 moves the chassis 8 by a small specified distance in one direction 26 and checks whether a counteracting torque acts on the chassis 8. The steering system 20 moves the chassis 8 back to the previous position 4, changes into the standing mode and causes the control station 22 to lower the lifting mechanism 7.

The chassis 8 has two wheels 27 coupled to the drive 21. The two wheels 27 are arranged offset with respect to each other on a transverse axis or wheel axis 28. The wheel axis 28 runs through the center of the two wheels 27. The wheels 27 can be parallel to each other; or the wheels 27 are inclined by a few degrees with respect to one another because of a wheel camber and/or a toe angle. The two wheels 27 substantially rotate about the wheel axis 28. Each of the wheels 27 is coupled to the drive 21. The drive 21 can comprise, for example, two electric motors 29. The wheels 27 each sit directly on a rotor 30 of one of the electric motors 29. Alternatively, the wheels 27 can be coupled to a central electric motor 29 via clutches and transmissions. The drive 21 exerts a torque acting about the wheel axis 28 on the wheels 27. The rotatingly driven wheels 27 move the chassis 8 over the floor 19. The chassis 8 moves straight ahead when the two wheels 27 rotate at the same speed. The wheels 27 can be driven individually by the drive 21. A different torque and different rotational speed of the wheels 27 enable the chassis to travel around a corner. The wheels 27 can preferably be driven in an opposed manner in order to rotate the chassis 8 about its vertical axis. The drive 21 receives control signals for rotational speed and torque of the two wheels 27 from the steering system 20. The steering system 20 generates the control signals in response to specified steering movements, for example steering movements specified by the user. The drive 21 can have a sensor arrangement for detecting the output torque and rotational speed of the wheels 27. The measurement data detected can be transferred to the steering system 20 in order to adjust the deviations of the steering movement.

The chassis 8 and the tool guide 1 now stand only with the two wheels 27 on the floor 19. The two contact points P1, P2 lie on a line parallel to the wheel axis 28. A third contact point with the floor 19 outside the line is missing for a statically stable standing position. The tool guide 1 would fall over without countermeasures. The steering system 20 achieves dynamic equilibrium by permanently balancing the center of gravity G of the lifting mechanism 7. On the basis of detection of the center of gravity G, the steering system 20 controls the drive 21 into generating a torque counteracting falling.

The lifting mechanism 7 is mounted on the chassis 8. The lifting mechanism 7 is immovable in relation to the chassis 8; in particular, the lifting mechanism 7 is immovable in relation to the drive 21 and the wheel axis 28. The lifting mechanism 7 is preferably connected rigidly to a stator 31 of the drive 21. The drive 21 generates a torque and a reacting torque, of the same size and opposite direction of rotation, in principle in pairs. The torque acts on the wheels 27 by the rotor 30 of the drive 21. The reacting torque acts on the lifting mechanism 7 via the stator 31 of the drive 21.

Figure 5:
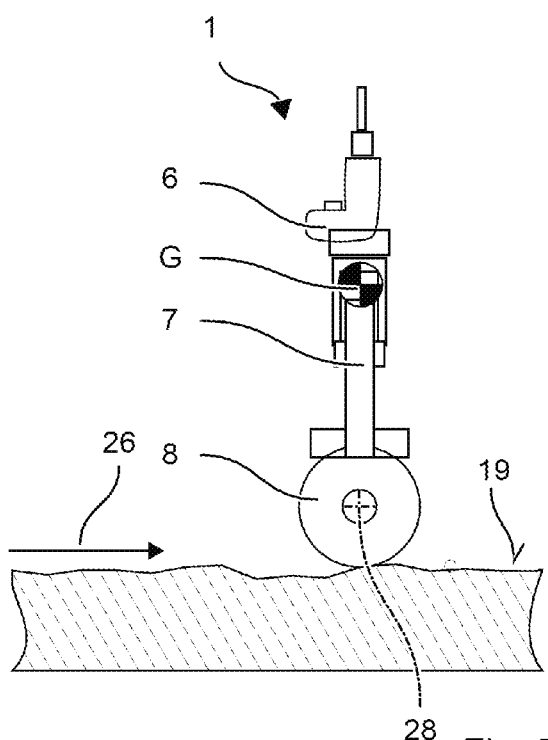
FIG. 5 shows a diagram for explaining the alignment (equilibrium)
Figure 6:
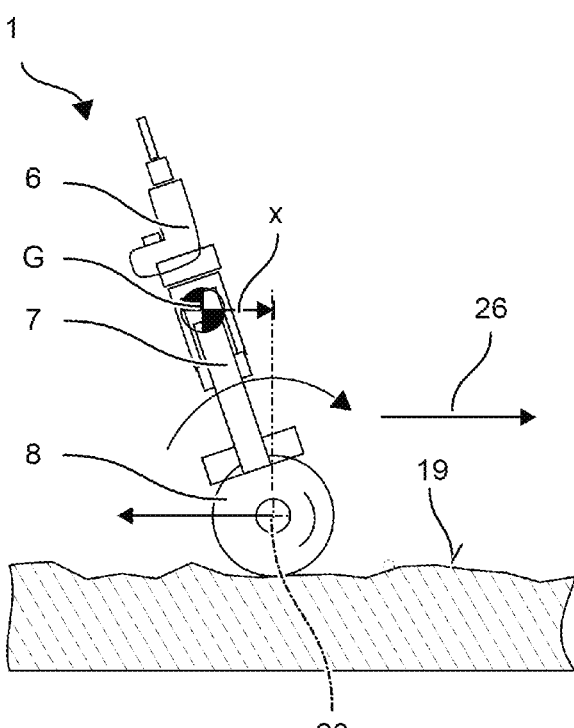
FIG. 6 shows a diagram for explaining the alignment in the forward and back direction.

The weight of the tool guide 1 is composed of the weight of the chassis 8 and the weight of the lifting mechanism 7. The weight of the portable power tool 6 is simply added to the weight of the lifting mechanism 7. The center of gravity of the chassis 8 lies approximately on the wheel axis 28. The wheels 27, the drive 21 and batteries 32 are arranged symmetrically about the wheel axis 28. The center of gravity G of the lifting mechanism 7 lies above the wheel axis 28. The tool guide 1 stands, if only meta-stably, when the center of gravity G is vertically above the wheel axis 28 (equilibrium, FIG. 5). A lateral deflection x is equal to zero. The tool guide 1 falls if the center of gravity G is offset in the lateral direction 33 in relation to the wheel axis 28, i.e., the lateral deflection x is unequal to zero (FIG. 6).

The steering system 20 has a (center of gravity) sensor 34 for detecting the lateral deflection x of the center of gravity G of the lifting mechanism 7. The lateral deflection x of the center of gravity G outside equilibrium results in different measurable variables. The lifting mechanism 7 is inclined in relation to gravitational force; the center of gravity sensor 34 can correspondingly comprise an inclination sensor. The falling movement leads to a characteristic acceleration; the center of gravity sensor 34 can comprise a gyro sensor, an acceleration sensor, a rate of rotation sensor, etc. for determining speed, acceleration, rate of rotation and/or rotational movement about the wheel axis 28. The inclined lifting mechanism 7 exerts a torque on the drive 21; the center of gravity sensor 34 can comprise a torque sensor, a force sensor, etc., for detecting a torque, a non-vertical force, etc. The sensors can detect the above-mentioned variables on the basis of mechanical, optical, magnetic or electrical effects.

The steering system 20 comprises a control sequence which, on the basis of the deflection x, determines a torque for erecting the lifting mechanism 7. For example, the steering system 20 can specify a torque which is proportional to the deflection x. The steering system 20 transmits the torque in the form of a control signal to the drive 21 which generates the torque. The control sequence can comprise a control loop which adjusts the deflection x to zero. Control parameters, such as the boost factor and the integral component can preferably be adapted, for example in order to adapt the control sequence to the different weight of the portable power tools 6.

The lifting mechanism 7 is aligned vertically by the motor power of the drive 21. The lifting mechanism 7 can be triggered by disturbances to the equilibrium and can oscillate repeatedly about the vertical alignment in reaction to the control sequence. Following the swinging action, the user cannot identify any further movement. The torque acting on the lifting mechanism 7 is opposed by the torque acting on the wheels 27. The wheels 27 rotate correspondingly, as a result of which the chassis 8 travels in the direction 26 of the deflection x (FIG. 6). The chassis 8 oscillates analogously to the lifting mechanism 7 about a central position. Friction and grip of the wheels 27 on the floor 19 damp the oscillation.

The statically unstable standing position of the chassis 8 and the balancing are used in order to vertically align the lifting axis 25. At dynamic equilibrium, the center of gravity G lies vertically above the wheel axis 28. The lifting mechanism 7 is arranged with respect to the wheel axis 28 in such a manner that a line which runs through the center of gravity G and the wheel axis 28 is parallel to the lifting axis 25. The exemplary lifting mechanism 7 has a compensating weight 35 on the holder 5 in order to adapt the position 4 of the center of gravity G for different portable power tools 6. The compensating weight 35 is lockable at different distances from the lifting axis 25. Instead of a compensating weight 35, the regulation can adjust the deflection x to a specified offset. The offset preferably takes into consideration the adjustment position of the lifting mechanism 7. Irrespective of the height of the lifting mechanism 7, the dynamic balancing aligns the lifting axis 25 vertically.

Figure 7:
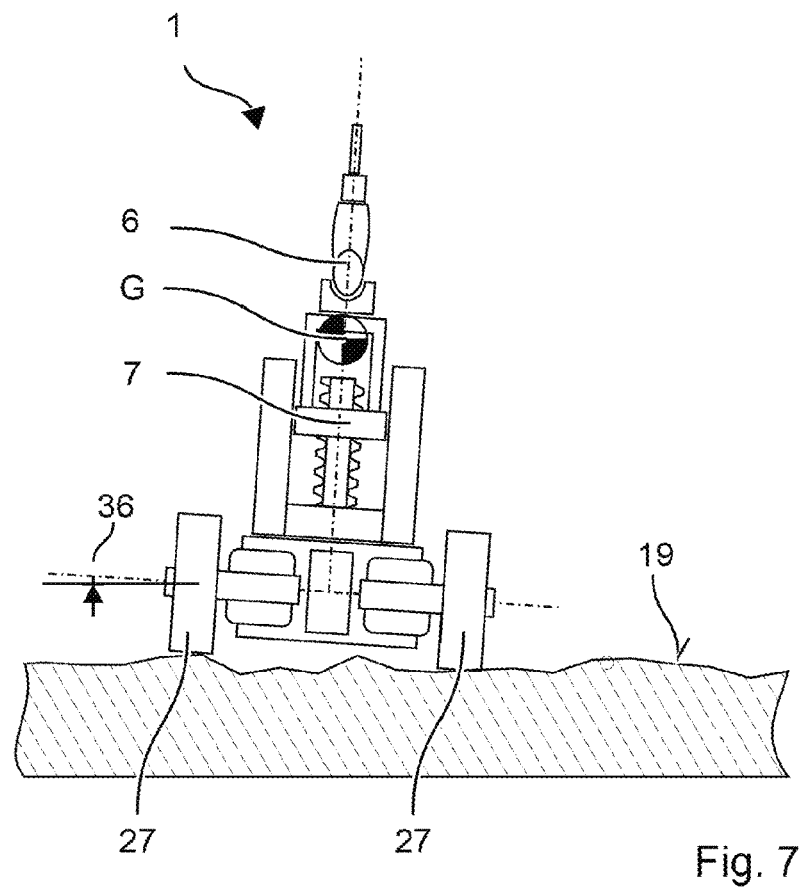
FIG. 7 shows a diagram for explaining the alignment in the transverse direction.
Figure 8:
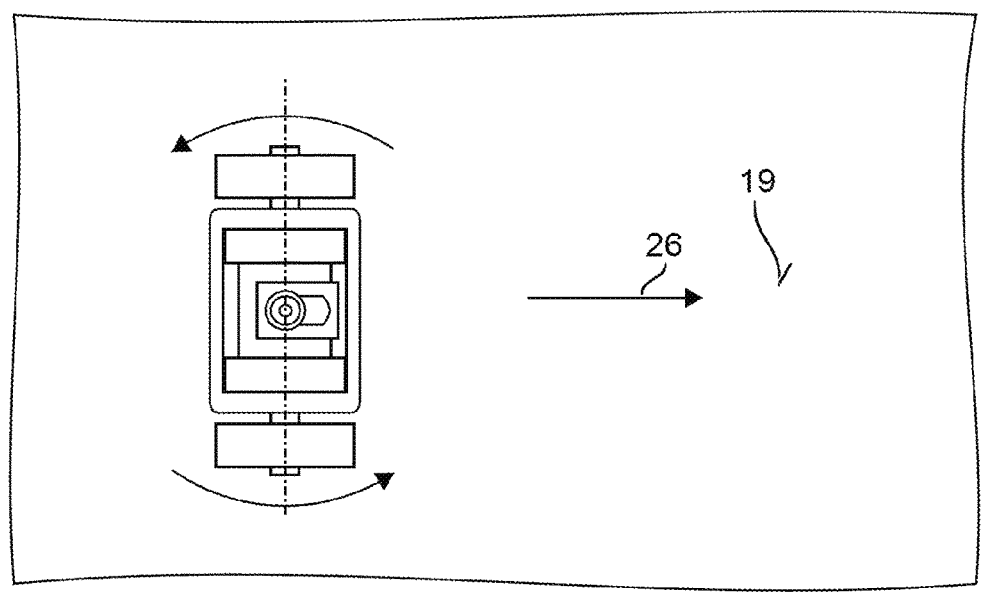
FIG. 8 shows a diagram for explaining the alignment in the transverse direction.

The dynamic balancing ensures a vertical alignment when the wheel axis 28 lies horizontally. The deflection x lies in a plane perpendicular to the wheel axis 28. In the event of an uneven floor 19 or an inclined floor 19, the wheel axis 28 can be inclined with respect to the horizontal plane (FIG. 7). The inclination 36 of the wheel axis 28 is transferred into just such an inclination of the lifting mechanism 7. The inclination 36 lies in a plane which is spanned by the wheel axis 28 and the vertical axis. The inclination of the wheel axis 28 cannot be directly compensated for by the dynamic balancing.

For the processing of the ceiling 3, the inclination 36 is preferably also compensated for. The exemplary controller 9 makes provision for the inclination 36 to be triggered when the lifting mode S3 is activated. The user or an external controller 9 will activate the lifting mechanism S3 when the tool guide 1 is positioned at the specified position 4. The compensation can also be triggered in a different mode. For example, a specific mode can be provided for the compensation, which mode is, for example, triggered automatically when the position 4 is reached or upon enquiry by the user.

The alignment therefore first of all makes provision to adjust the two wheels 27 to the same height. The tool guide 1 rotates about a vertical axis which, for example, coincides with the working axis 18. The vertical axis denotes an axis which is perpendicular to the wheel axis 28 and runs substantially along the vertical axis. The tool guide 1 is preferably positioned in such a manner that the vertical axis runs through the specified position 4. The steering system 20 rotates the two wheels 27 at the same rotational speed in an opposite direction 26. The tool guide 1 and the tool 11 therefore remain at the same position 4. The compact design with the small standing space typically permits this rotation even in confined spaces. The rotation takes place until the inclination 36 of the wheel axis 28 is equal to zero. Since the tool guide 1 touches the floor 19 with only two wheels 27, at each position 4 there is at least one setting in which all of the wheels 27 are at the same height. An inclination sensor 37 can detect the inclination of the wheel axis 28 in relation to the horizontal plane. The inclination sensor 37 can be implemented, for example, by the center of gravity sensor 34 or analogously. The steering system 20 balances the lifting mechanism 7 in the lateral direction 26 perpendicular to the wheel axis 28. The torque on the two wheels 27 acts in the same direction 26 and is typically the same size.

The steering system 20 comprises, for example, a console 10 with input elements for travel direction and speed. An exemplary console 10 is based on a biaxial joystick. Other consoles can have, for example, a steering wheel for the travel direction and a slide for the speed. The console 10 is preferably removable from the tool guide 1. Control signals generated by the console 10 are transmitted to the drive 21 on a radio basis, optically or on a line basis. The steering system 20 can detect a push or pull force exerted on the chassis 8 by the user. Under the action of the force, the chassis 8 tips in the direction 26 of the push or pull force. The steering system 20 detects the deflection x of the chassis 8. A speed of the chassis 8 can be, for example, proportional to the deflection x.

The exemplary lifting mechanism 7 is based on a linear rail guide 38. Two parallel profile rails 39 are fastened on the chassis 8. The two profile rails 39 define the lifting axis 25. An impeller 40 engages in the two profile rails 39. The impeller 40 is displaceable on the profile rails 39 along the lifting axis 25. An electric motor 41 and a spindle 42 form the propulsion system 24 for the impeller 40. The spindle 42 is mounted rotatably between the two profile rails 39. The impeller 40 has a thread 43 engaging in the spindle 42. The electric motor 41 rotates the spindle 42 about its longitudinal axis; the thread 43 converts the rotational movement into a movement along the lifting axis 25. The lifting mechanism 7 illustrated is an example of a telescopic lifting mechanism. Instead of or in addition to profile rails and impeller 40, tubes inserted one into another can be used in the same manner. Another propulsion system 24 is based on a rack and a pinion driven by the motor. Alternatively, a hydraulic or pneumatic press can also raise the lifting mechanism 7.

The exemplary lifting mechanism 7 can comprise a manually telescopic platform 44 in addition to the power-driven lifting mechanism 7. The platform 44 can be constructed comparatively compactly. The power-driven section can be brought to a basic height by means of the platform. The platform 44 can be a single- or multi-stage platform. The exemplary platform 44 is based on a rail guide.

An exemplary holder 5 has a trough-shaped shell 45 with a tensioning strap 46. The handle 16 can be positioned in the shell 45 and secured in the shell 45 by the tensioning strap 46. The housing of the portable power tool 6 can be lashed to the holder 5 with a second tensioning strap 47. The holder 5 is preferably displaceable perpendicularly to the lifting axis 25. The holder 5 can be displaceable, for example, on a dovetail guide 48. The user can position the working axis 18 vertically with respect to the wheel axis 28. The holder 5 can comprise an angular setting which permits a precise alignment of the working axis 18 parallel to the lifting axis 25. The angular setting comprises, for example, a joint and an adjustment screw.

The lifting mechanism 7 is preferably equipped with a sensor 49 for determining the contact pressure on the ceiling 3. For example, the holder 5 is supported in the vertical direction 26 on a spring 50. The contact pressure compresses the spring 50. A displacement sensor 51, for example a sliding potentiometer, determines the displacement distance by which the spring 50 is compressed. With the spring constant being known, the sensor 49 determines the contact pressure. Other sensors for determining the contact pressure can be based on piezo electric effects, strain gages, etc. Other refinements determine the contact pressure indirectly. For example, the sensor 49 includes an evaluation of the power consumption, for example current consumption, of the propulsion system 24. A correlation of the power consumption and a measure for the contact pressure are stored in a table in the sensor. The initial pressing of the tool 11 against the ceiling 3 is detected by the sensor 49 as a jump in the contact pressure. The sensor 49 indicates to the control station 22 in a control signal that the tool 11 is lying against the ceiling 3. The control station 22 can correspondingly stop a manual control of the lifting mechanism 7 and change into the processing mode. In a preferred variant, a desired value for the contact pressure is stored in the control station 22. The desired value can be input or selected beforehand by the user. The desired value is dependent on the tool 11, for example a diameter of the drill. The propulsion system 24 is adjusted to a constant contact pressure. The sensor 49 as part of a protective circuit 52 can provide a measurement value for the contact pressure. The protective circuit 52 stops a raising of the lifting mechanism 7 if the measurement value exceeds a threshold value.

Figure 9:
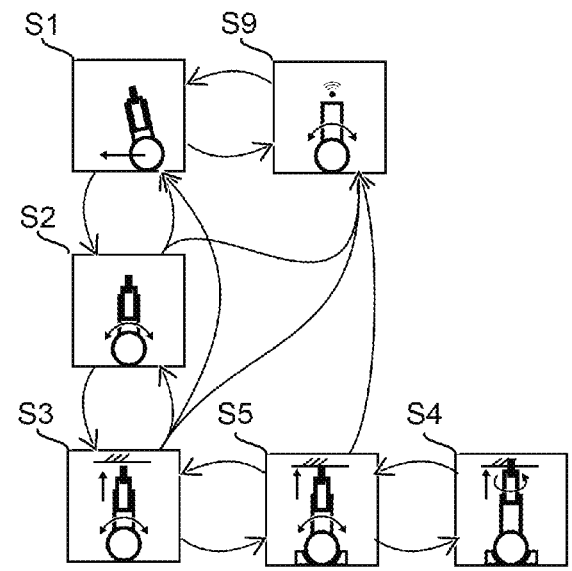
FIG. 9 shows a status diagram.

In one refinement, the tool guide 1 can suspend the dynamic balancing when the tool 11 touches the ceiling 3. With the contact point against the ceiling 3, the tool guide 1 can stand statically. The tool guide 1 can change into a stop mode S5 in which the wheels are locked by a brake 53 (FIG. 9). The balancing and the associated slight oscillating movement stop.

The tool guide 1 has a (contact) sensor 54 which detects a contact with the ceiling 3. The tool 11, consumable material or the portable power tool 6 typically touches the ceiling 3. The holder 5 indirectly touches the ceiling 3. The contact sensor 54 outputs a (contact) signal to the controller 9 in which it is encoded whether the tool 11 is in contact with the ceiling 3. The contact sensor 54 can evaluate, for example, the contact pressure of the lifting mechanism 7 or a measure for the contact pressure. The contact sensor 54 indicates a contact if the contact pressure exceeds a threshold value or a rate of change of the contact pressure exceeds a threshold value. The threshold value is preferably dimensioned in such a manner that the associated contact pressure is sufficient to hold the tool guide 1 in a static stable standing position via the two wheels 27 and the contact point on the ceiling 3. The contact sensor 54 can be realized, for example, by the sensor 49 or an analogous sensor 49.

When the contact signal is present, the controller 9 preferably suspends the balancing of the chassis 8, The controller 9 can delay the suspension until the contact signal is present for a minimum duration. When the contact signal is present, the steering system 20 checks whether the lifting mechanism 7 is aligned vertically. If the steering system 20 detects a deviation from the vertical alignment, the control station 22 lowers the lifting mechanism 7 in response thereto. The lowering can take place by a predetermined stroke, for example 1 cm. Alternatively, the stroke can be determined on the basis of the deviation from the vertical alignment and/or the height of the lifting mechanism 7. For example, the stroke is proportional to the product of the deviation in an angular dimension and the current height of the lifting mechanism 7. The tool 11 is detached from the ceiling 3. Consequently, the contact sensor 54 indicates no contact any longer with the ceiling 3. The controller 9 immediately reactivates the balancing by means of the steering system 20. The steering system 20 aligns the lifting mechanism 7 vertically. The controller 9 can repeat the method described in the paragraph iteratively until the lifting mechanism 7 is aligned vertically. The controller 9 subsequently raises the lifting mechanism 7 at least preferably to an extent until a contact signal is present. The tool guide 1 is now aligned vertically.

The chassis 8 preferably has a brake 53. The brake 53 is preferably activated as soon as the tool guide 1 is aligned vertically and the contact signal is present. The brake 53 is a parking brake which permanently locks the wheels 27 of the chassis 8. The brake 53 is realized, for example, as an engine brake. The brake 53 generates an electromagnetic force which opposes a movement of the wheels 27. The brake 53 can be passive. The electric motors 29 can generate an electric current in the stator 31 in accordance with the principle of a generator if the rotor 30 of the electric motors is rotated. Examples of the electric motors 29 with the principle of a generator are direct current motors, universal motors, etc. The current generated by generator is short-circuited by the brake 53 via a load resistance. The reactive magnetic field opposes the rotational movement of the rotor 30. Alternatively, a rotational speed sensor or movement sensor can detect a movement. The steering system 20 determines a corresponding control signal in order to steer the propulsion system 24 counter to the movement. The brake 53 can also be realized by a mechanical brake in the chassis 8, for example a disk brake or drum brake. The mechanical brake 53 can assist the motor brake.

The tool guide 1 has one or more batteries 32, 55. The batteries 55 supply the steering system 20, the control station 22, the electric motors 29 of the drive 21, the electric motor 41 of the propulsion system and optionally the portable power tool 6 with current. The batteries 55 can comprise a stationary battery 32 and one or more removable batteries 55. The stationary battery 32 is preferably integrated in the chassis 8. The tool guide 1 has corresponding electromechanical interfaces for the removable batteries 55. The interfaces correspond, for example, to the interfaces of portable power tools 6. The user can exchange discharged batteries 55 for charged batteries 55 and can charge the discharged batteries 55 in a separate charging station. The power consumption of the portable power tools 6 is typically significantly above 200 Watts. A correspondingly large capacity has to be provided by the batteries. The stationary battery 32 is electrically connected to the other batteries 55. A charging regulator 56 charges the stationary battery 32 with the other batteries 55. The charging regulator 56 preferably keeps a charging state of the stationery battery 32 above an emergency value. The user can remove the other batteries 55 without risk. The stationary battery 32 has a sufficient charging state because of the emergency value to balance the chassis 8 for at least 10 minutes, preferably at least half an hour.

The tool guide 1 enters into an (emergency) mode S9 if the charging state of the batteries 32, 55 drops below the emergency value. The emergency mode ensures a secure standing position of the tool guide 1. The chassis 8 and the steering system 20 are supplied with current. The user can move the tool guide 1 to a charging station or to another desired location. Other consumers are preferably deactivated; in particular the lifting mechanism 7 and the portable power tools 6 are deactivated. For example, the control station 22 can be blocked for an input from the user. The user can no longer raise the control station 22. The portable power tool 6 can be separated from the batteries by means of a switch. The lifting mechanism 7 can be brought automatically to the lowest height in the emergency mode. In the emergency mode, the tool guide 1 can indicate the emergency mode optically or acoustically.

The invention claimed is:

1. A self-aligning tool guide, comprising:
   a holder for securing a portable power tool for working on a ceiling;
   a lifting mechanism on which the holder is mounted and which has a propulsion system for raising the holder parallel to a lifting axis;
   a self-balancing chassis which has two wheels on a wheel axis;
   a drive coupled to the two wheels;
   a contact sensor for detecting an indirect contact of the holder with the ceiling; and
   a brake for the self-balancing chassis.

2. A control method for the self-aligning tool guide as claimed in claim 1, comprising the steps of:
   detecting a lateral deflection of a center of gravity of the lifting mechanism in relation to the wheel axis;
   balancing the self-balancing chassis by activation of the drive, wherein the drive outputs a torque that counteracts the lateral deflection;
   raising the holder to a ceiling via the lifting mechanism; and
   suspending the balancing upon detection of an indirect contact of the holder with the ceiling.

3. The control method as claimed in claim 2 further comprising the step of activating the brake upon detection of the indirect contact.

4. The control method as claimed in claim 2 further comprising the step of reactivating the balancing when an end of the indirect contact is detected.

5. The control method as claimed in claim 2, wherein, when the indirect contact is detected, an alignment of the lifting mechanism in relation to a vertical alignment is detected and, if the alignment deviates from the vertical alignment, the lifting mechanism is lowered.

* * * * *